United States Patent [19]
Chu

[11] 3,732,693
[45] May 15, 1973

[54] CONTROLLABLE SOLID PROPULSION SYSTEM

[76] Inventor: Ju Chin Chu, Post Office Box 3497, Orange, Calif. 92665

[22] Filed: Nov. 27, 1970

[21] Appl. No.: 93,359

Related U.S. Application Data

[63] Continuation-in-part of Ser. No. 677,920, Oct. 25, 1967, abandoned.

[52] U.S. Cl. ..................60/207, 60/218, 60/220, 60/229, 60/251, 60/252, 60/219
[51] Int. Cl. .................................................F02k 9/04
[58] Field of Search..................60/251, 252, 207, 60/218, 219, 220, 229; 149/36

[56] References Cited

UNITED STATES PATENTS

| | | | |
|---|---|---|---|
| 2,930,184 | 3/1960 | Plescia | 60/218 |
| 3,015,210 | 1/1962 | Williamson | 60/229 |
| 3,021,667 | 2/1962 | Griffin | 60/219 |
| 3,101,589 | 8/1963 | Hamrick | 60/251 |
| 3,120,738 | 2/1964 | Chilenski | 60/219 |
| 3,128,599 | 4/1964 | Carr | 60/251 |
| 3,331,203 | 7/1967 | Kaufman | 60/219 |
| 3,350,887 | 11/1967 | Leunig | 60/251 |
| 3,456,440 | 7/1969 | Keller | 60/251 |
| 3,492,177 | 1/1970 | Rau | 149/36 |

Primary Examiner—Douglas Hart

[57] ABSTRACT

A controllable solid propulsion system for aero-space vehicles, comprising a fuel in gel form contained in a collapsible bellows within a pressurizable fuel tank of small length-to-diameter ratio, means to pressurize the fuel tank and to force the fuel gel into the thrust chamber of a rocket motor containing a packed bed of granulated solid oxidizer. Reaction of the fuel gel and oxidizer provides propulsive reaction gases. The gel may be catalytically decomposed to gaseous reaction products for reaction with the oxidizer to provide increased thrust.

15 Claims, 4 Drawing Figures

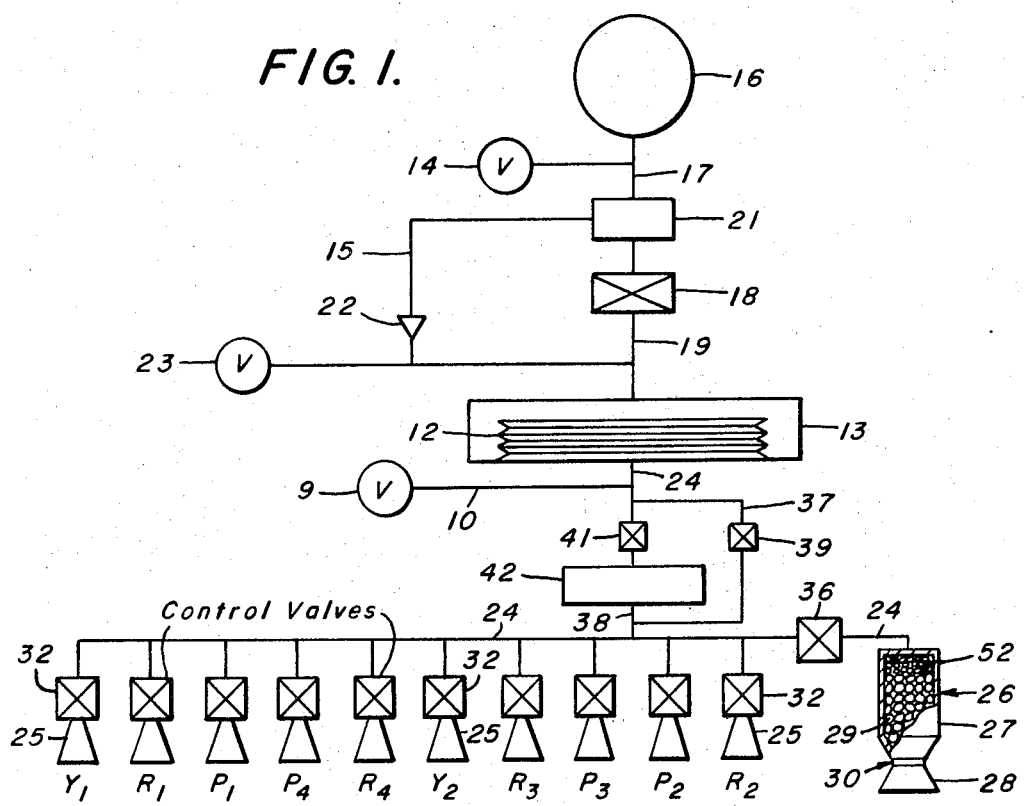
FIG. 1.
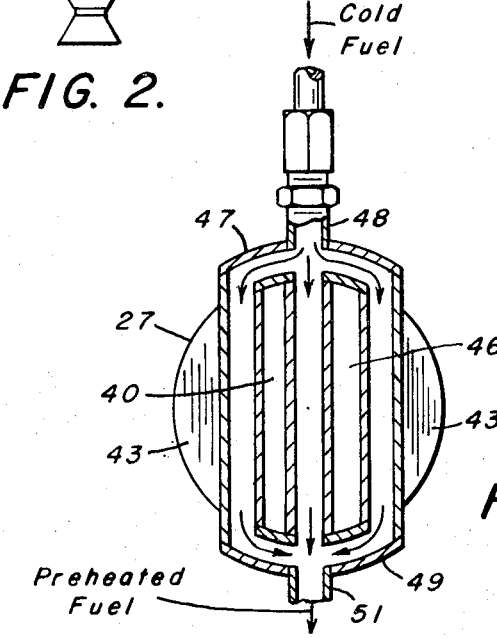
FIG. 2.
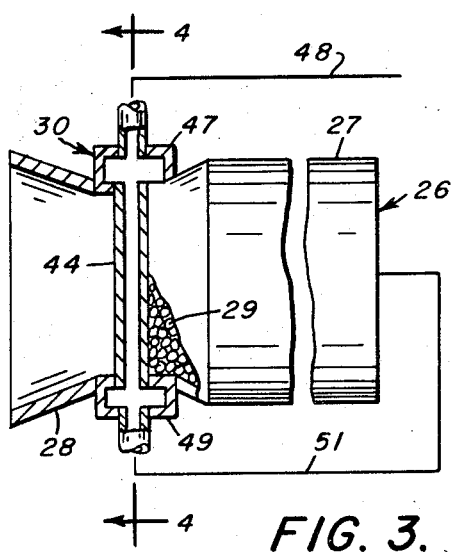
FIG. 3.
FIG. 4.
INVENTOR.
JU CHIN CHU

CONTROLLABLE SOLID PROPULSION SYSTEM

PRIOR APPLICATION

This application is a continuation-in-part of application Ser. No. 677,920, filed Oct. 25, 1967, by Ju Chin Chu for Controllable Solid Propulsion System, now abandoned.

BACKGROUND OF THE INVENTION

Controllable propulsion systems in rocket-powered space and re-entry vehicles of the prior art have several disadvantages. For example, prior art bipropellant liquid engines, although having high specific impulse, stop and restart capability, and rapid engine response, have the disadvantages accompanying complex plumbing and associated liquid fuel and oxidizer storing and handling systems. Due to the possibility of liquid leakage in such complex systems, bipropellant systems present many and serious safety hazards. Liquid monopropellant systems, such as hydrazine, eliminate the problems of handling a liquid oxidizer, but still retain the monopropellant in the liquid phase. The problems associated with storability, handling and leakage are also present in the liquid monopropellant system. Moreover, the specific impulse of the monopropellant system is much lower than that of the bipropellant liquid system. For example, the delivered specific impulse of hydrazine in a catalytic chamber is about 235 seconds compared to 285 seconds for a bipropellant system, using nitrogen tetroxide and hydrazine.

Present day and future missions of many manned and unmanned aero-space vehicles, including re-entry vehicles, may require prolonged storage, e.g. as long as ten years or more, under various conditions, including, in some instances, frequent logistic transportation, as in the case of mobile force vehicles. The safety factor, including the possibility of liquid leakage and fire hazard, is important under such conditions, and the disadvantages of liquid systems must be carefully considered in their adoption, even in view of the reasonably good safety record of pre-packaged liquid systems. Similar considerations are relevant also in respect to choice of engines for prolonged-mission space vehicles which require extended start-stop capability and good controllability, together with maximum operational performance.

Thus, for such vehicles, and taking all such considerations into account, the all-solid propulsion system becomes a logical choice.

The solid systems prepared or under development are based upon either a single chamber or dual chamber concept. The specific impulse is relatively low. Either a hot gas valve (2,200°–2,900°F) or a high temperature pintle (5,000°F) is used for the on-off control. The successful development of such devices exposed to hot and corrosive gas is highly questionable. When a dual chamber is used, the solid propellant in the gas generator is kept burning continuously once it is ignited. A considerable amount of propellant is thus wasted without serving the function of either axial or attitude control. The response time for the thrust rise and extinguishment is long, and thrust modulation is difficult. When an oxidizer-rich solid propellant is used in a thrust motor or aft-chamber, it becomes extremely difficult to find a binder with high burner rate exponent without causing cracking in the fuel grain during either storage or firing. The hardware associated with the existing solid systems is still quite complex in design and poor in reliability.

SUMMARY OF THE INVENTION

Accordingly, it is an object of this invention to provide controllable solid propulsion systems which eliminate the shortcomings of existing, prior art solid propulsion systems in terms of reliability of performance, start-stop capability, thrust modulation control and hardware complexity.

This and other objects of the invention will become apparent from the following description and drawings, wherein:

FIG. 1 is a schematic elevational view of one embodiment of the invention wherein a hydrazine fuel gel is converted to gaseous hydrogen and ammonia and utilized, as such, for powering a plurality of attitude control thrusters, and further reacted with solid oxidizer particles in a high thrust axial motor;

FIG. 2 is a schematic elevational view of an alternative attitude control system thruster utilizing the fuel oxidation principle of the axial motor of FIG. 1;

FIG. 3 is a side view, partly in cross-section, and partly in schematic form, illustrative of one embodiment of a combined solid oxidizer retaining and tubular fuel regenerative cooling device, and FIG. 4 is a view, partly in cross-section, taken along lines 4—4 of FIG. 3, of the retaining and cooling device of FIG. 3.

In accordance with the foregoing objects, and as shown in the drawings, the basic features of the new controllable propulsion system of this invention, useable for any re-entry vehicle and for many other aerospace vehicles, comprise a generally pancake-shaped propellant tank and bellows assembly containing gelled fuel, and a thrust chamber containing a packed bed of granulated oxidizer. Between the thrust chamber and the propellant tank, there is provided a valve to control the flow of the fuel. On command, pressurizing fluid flows from the propellant tank, causing the fuel gel to flow into different thrust chambers under pressure to react with the granulated oxidizer producing thrust for axial and attitude control.

DESCRIPTION

A new feature in controllable propulsion systems, in accordance with this invention, is the provision, in separate units during storage and before the mission, of a solid oxidizer and a fuel in gel form which is free from the hazards of leakage.

Thus, as shown in FIG. 1, a solid fuel, in stable gel form, is filled under pressure through a valve 9 and line 10 into a bellows assembly 12 within a propellant tank 13. Among storable fuels, hydrazine and hydrazine derivatives are the most convenient ones to use. The conversion of a liquid hydrazine into a hydrazine gel is a well known art. A small amount of additive, such as modified polyacrylic acid, can transform hydrazine into a mechanically stable gel which is stable up to at least 160°F. A special gelling agent known as Aerojet General AP can be used. Aluminum, beryllium or beryllium hydride powder of micron size may be added to the hydrazine to increase its performance.

A pressurant tank 16 is pressurized, through a fill valve 14 with a pressuring fluid. The latter flows through line 17 to a regulator 18 which controls fluid flow and pressure through line 19 to tank 13 upon command and in response to any suitable, known signal receiving and actuating means, indicated schematically by the device 21 in line 17. A relief valve 22 in line 19, which valve 22 may also be controlled as desired by control device 21, through line 15, provides for reduction of pressure in tank 13 as may be required by power needs, and which valve 22 may also be set to reduce the pressure in tank 13 if such pressure exceeds a predetermined valve. Fluid released through valve 22 is vented through a vent valve 23.

Upon pressurization of the fuel tank 13, the collapsible bellows 12 is compressed, whereby fuel gel is forced from the bellows through a fuel line 24. As illustrated in FIG. 1, the fuel gel from bellows 12 may be directed, through one or the other of two alternative paths, depending upon the type of the engines and thrusters used. A vehicle in which the inventive propulsive system finds application will comprise one or more rocket motors for provision of axial motion to the vehicle. Such an axial engine or motor is illustrated generally, in schematic form, in FIG. 1 by the numeral 26. The engine 26 is of generally conventional rocket motor construction, having a generally cylindrical casing defining a thrust chamber 27 and a conventional divergent exhaust nozzle 28.

In accordance with this invention, the thrust chamber 27 contains a packed bed of solid, granulated oxidizer particles 29, retained within the chamber 27 by means of a retaining plate or device denoted generally by the numeral 30, the device 30 being located adjacent the throat of the nozzle 28.

Depending upon the mission duty cycle, the packed bed of solid oxidizer may consist of several layers of different particle size. The size of particles in each layer and the thickness of different layers is also determined by the interfacial area of contact required between the solid oxidizer and the incoming fuel gel. It is entirely possible to achieve a constant burning rate by controlling the particle size and the bed thickness of different layers within a packed bed of solid oxidizer. A normal size range of particles can be between 1 inch and 100 mesh. Since the mass of the oxidizer particle is proportional to the particle diameter to the third power, a large change in the mass corresponds to a much smaller variation in the particle size. For a 2.5-fold decrease of the oxidizer particle diameter, more than 93 percent of the solid oxidizer can be fully utilized for producing thrust. This compares very favorably with the dual chamber solid system, which can waste as much as 40 percent of the propellant.

The solid oxidizer to be used in the thrust chamber preferably is selected from the group consisting of nitronium perchlorate, hydrazinium diperchlorate, ammonium perchlorate and the oxidized form of urea or thio-urea. Some oxidizers, such as nitronium perchlorate, are very reactive to moisture and may require 8 percent coating by Kel-F or other flourocarbon for each granulated particle. Oxidized forms of urea and thio-urea have the following formulas:

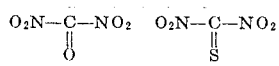

These oxidizers, which have never been used before, hold promise as the best oxidizers for controllable propulsion systems. With hydrazine gel fuel and a packed bed of granulated solid nitronium perchlorate as oxidizer in the thrust chamber, a delivered specific impulse of 279 seconds can be demonstrated. Performance can be further enhanced by fuel injector and thrust chamber design since the theoretical specific impulse is much higher than the latter value. Other solid oxidizers known to the prior art can be used.

In addition to the axial motor 26, the usual re-entry or other aero-space vehicle comprises a plurality of smaller motors, or "thrusters", suitably arranged to effect attitude control of the vehicle during flight.

In FIG. 1, the letters "Y", "R" and "P" designate thrusters for control, respectively, of yaw, roll and pitch. As therein shown, several sets of thrusters, designated by the numerals 1–4, may be provided, and collectively comprise the vehicle attitude control system. Each thruster comprises a thruster nozzle 25 and is provided with a control valve 32 to actuate and regulate thruster operation.

As depicted in FIG. 2, the thrusters may, if desired, be provided with an oxidizer chamber 33 containing a solid particulate oxidizer bed 34 as in the case of axial motor 26.

A control valve 36 is located in line 24, between the gel tank 13 and axial motor 26. In the embodiment of FIG. 1, between valve 36 and the gel tank, fuel line 24 comprises two alternative branches, i.e. lines 37 and 38. Branch 37 is provided with a further valve 39, and branch 38 is provided with a similar valve 41. Together, control valve 36, with valves 39 and 41, and thruster control valves 32 control flow of fuel to all vehicle motors.

A catalyst chamber 42 is located in line 38 below valve 41 and is provided with a packed bed of particulate catalyst capable of decomposing the fuel gel into gaseous reaction products; for example, hydrazine gel is decomposed into a gaseous mixture of hydrogen and ammonia, e.g. by Shell Catalyst-405. Such decomposed gel gases can be reacted with the granulated oxidizer to provide higher thrust. The catalyst also serves to remove the gelling agent in the fuel gel, which is desirable where, for example, the hydrazine gelling agent has an inhibiting effect upon the reaction between hydrazine gel and solid oxidizer.

If desired, the gelling agent may be removed from the fuel gel by means of a separate absorber located between the fuel tank and the bed of oxidizer particles, preferably before the fuel gel is injected into the thrust chamber. Any suitable absorbing material may be used. For example, when using a hydrazine or hydrazine derivative gel, a sodium hydrate-asbestos absorbent, such as Ascarite, or other absorbent basic oxides inert to hydrazine, may be used. Such materials also may be used in conjunction with the gel-decomposing catalyst.

To retain the solid oxidizer particles in the thrust chamber during the flow of fuel gel or its hot decomposition gases into the latter, it is necessary to provide some kind of retaining device in the form of either a perforated plate or screen at the bottom of the thrust chamber adjacent the throat of the exhaust nozzle. Since the thermal condition is at its severest at the throat of the thrust chamber, either rocket engine or thruster, the retaining device is preferably in the form of a multiple number of parallel tubes or both parallel and crossing tubes, inside of which the hydrazine gel, liquid or vapor can be circulated prior to its entrance into the injector, thereby to provide regenerative cooling at the retaining end for the oxidizer particles. FIGS.

3 and 4 are illustrative of one form of parallel tube retaining-regenerator which may be used. Thus, the engine, for example, the axial motor 26, is provided, at the lower or outward end of the thrust chamber 27 with a retainer plate 43 (FIG. 4) to which are affixed a plurality of cooling tubes 44 serving to support the oxidizer bed 29, and the spaces 46 between the tubes providing egress for the hot reaction gases to the exhaust nozzle 28. The extremities of tubes 44 are interconnected, at one end to a cold fuel inlet header 47 and fuel inlet line 48, and, at the other end, to a hot fuel outlet header 49 and fuel outlet line 51 from which preheated fuel is conducted to a suitable injector device for injection into the thrust chamber.

The dimensions of, and spacing between, the regenerative cooling and retaining tubes of FIGS. 3 and 4 are greatly exaggerated, and the number of tubes reduced in number, for the sake of clarity in the drawings.

OPERATION

It is to be understood that, in those embodiments of the invention wherein the thrusters are designed and constructed without the oxidizer bed as shown in FIG. 2, but, instead, are intended for use directly with gaseous gel decomposition products, e.g. the hydrogen-ammonia mixture obtained by hydrazine gel decomposition, the propulsion system configuration utilized will be that wherein the fuel flow path is through fuel line 24 – valve 41 – catalyst chamber 42 – line 38 – line 24 and thence to the engines. Attitude control is obtained by opening and closing of thruster valves 32 whereby the thrusters are powdered by the hydrogen-ammonia gas mixture. The axial motor 26 is powdered by opening control valve 36 to admit the hydrogen-ammonia fuel gas mixture to thrust chamber 27 and to cause reaction therein with the granulated oxidizer.

With such a fuel path configuration, added thruster power can be obtained by providing the thruster design of FIG. 2 whereby the hydrogen-ammonia-oxidizer reaction also takes place in the thruster engines.

Other embodiments of the invention utilize a FIG. 1 flow path of fuel gel through line 24 – valve 39 – line 24 and thence to the engines, whereby the gel reacts directly with the granulated oxidizer. In such embodiments, granulated oxidizer must, of course, be provided in the thrusters as well as in the axial motor thrust chamber. Practically, a particular vehicle construction will incorporate only one of the above-described alternate fuel flow paths. However, other embodiments of the invention are also practical. For example, the packed bed in the engine thrust chambers, either axial motor or thruster, may comprise one or more layers of catalyst, as well as granulated oxidizer. Thus, a top layer 52 of catalyst provided in the axial motor thrust chamber as shown in FIG. 1, or a layer 53 in the thruster engine as shown in FIG. 2, being adjacent the fuel injector entry, and first contacted by the injected fuel gel, will decompose the gel to form fuel gases for reaction with the underlying solid oxidizer particles.

Still another embodiment comprises uses of the aforesaid mixed catalyst-oxidizer bed in the axial motor, and only a catalyst bed in the thrusters, whereby maximum thrust is obtained in the axial motor by reaction of gel decomposition products with oxidizer, and the gel is simply decomposed in the thrusters which utilize the gel decomposition products for thrust power.

FUEL STORAGE AND HANDLING

A particular feature of the hardware aspect of the invention is the design and construction of the means for storing and handling the fuel. The gel form of the fuel allows the use of the highly advantageous fuel storage system as illustrated schematically in FIG. 1. The shock and vibration of high acceleration encountered in vehicles of the type contemplated is a contributory factor to fuel system component damage in conventional designs. These disadvantages are greatly reduced in the present fuel storage system by the provision of a fuel tank 26 and associated fuel gel-containing bellows 12 wherein both tank and bellows have a greatly reduced height and greater diameter than usual, relatively more elongated prior art fuel tank construction. A relatively short bellows, with wider base at its fixed extremity, greatly reduces the resonance and motion of the movable head end of the bellows. Commensurately, the cross-sectional area of the propellant tank 13 perpendicular to the direction of propellant flow, is made comparatively much larger than the height of the tank which is parallel to propellant flow direction. The consequent propellant tank design is of a generally "pancake" shape, having a length-to-diameter ratio of, for example, about 1 to 10 or even less, depending upon the vehicle envelope or housing dimensional limitations upon the controllable propulsion system design. The use of a generally flat, wide circular or oval-shaped cylinder for the fuel tank design is entirely compatible with present envelope restrictions. Such a design can easily accommodate a spherical pressurant tank 16 at the top of the fuel tank, i.e. toward the nose of the vehicle. The pressurant system can comprise, for example, pressurized helium or a "boot-strapped" gas generator using solid propellant or gelled fuel.

Flow of pressuring fluid from the pressurant tank 16 into the top of fuel tank 12 compresses the squat bellows assembly 12. Such bellows compression involves only little bellows movement during flow of the fuel gel out of the bellows due to the large bellows cross-sectional area. The pitch and span selection can also be made in a more liberal way to avoid material bunching and cracking.

Although such collapsible bellows design is preferred for storage and feeding of the contemplated gelled fuel, other means may be utilized. For example, a generally cylindrical fuel tank, preferably of small L/D ratio as aforesaid, can be provided with a floating piston whereby pressurant fluid uniformly forces gel fuel from the fuel tank. In some cases, the gel fuel, contained in the fuel tank without use of a bellows, can simply be ejected from the fuel tank by pressure of a pressurizing gas.

Still another embodiments and modifications can be made, by those skilled in the art, to the controllable propulsion system without departing from the spirit and scope of the invention.

I claim:
1. A controllable propulsion system comprising:
   a. a pressurizable fuel tank containing a storable fuel gel,
   b. thruster means comprising at least chamber containing a bed of solid oxidizer particles, wherein said oxidizer bed comprises a plurality of layers of oxidizer particles of varying particle size such that a substantially constant interfacial area of contact is maintained between the fuel gel and the oxidizer particles during the course of the reaction therebetween to provide a substantially constant reaction rate and propulsion thrust, said thrust chamber connecting at an exhaust gas end thereof with a divergent exhaust gas nozzle,
c. means between said oxidizer-containing thrust chamber and the respective nozzle for retaining oxidizer particles within said thrust chamber and adapted to permit flow of exhaust gases from said thrust chamber into the respective nozzle,
d. means interconnecting the fuel tank and a fuel injection end of said thrust chamber,
e. means to pressurize the fuel tank and to cause fuel gel to flow therefrom through said interconnecting means into said oxidizer-containing thrust chamber thereby to react the fuel and oxidizer to provide propulsive thrust by ejection of reaction gases from said nozzle, and
f. means to control the flow of fuel gel into said oxidizer-containing thrust chamber thereby to regulate the occurrence and extent of propulsive thrust exerted by the thruster means.

2. A controllable propulsion system in accordance with claim 1, wherein the oxidizer retaining means comprises hollow fluid passage means, and means to pass the fuel through said passage means prior to the injection into the thrust chamber thereby providing regenerative cooling of the thruster means during reaction between the fuel and the oxidizer.

3. A controllable propulsion system in accordance with claim 1, wherein the fuel gel is selected from the group consisting of gelled hydrazine and hydrazine derivatives, and there is provided, between the fuel gel tank and the bed of oxidizer particles, a bed of catalyst particles effective to decompose fuel gel passed therethrough and to provide gel decomposition gases reactable with the oxidizer to produce propulsive gases.

4. A controllable propulsive system in accordance with claim 3, wherein the catalyst bed is contained within the thrust chamber between the fuel injection and thereof and the oxidizer bed.

5. A controllable propulsion system in accordance with claim 3, wherein a separate catalyst chamber is provided between the fuel tank and the thrust means, and comprising means to pass the fuel gel through the catalyst chamber to provide gel decomposition gases reactable with the oxidizer contained in the thruster means thrust chamber.

6. A controllable propulsion system in accordance with claim 5, comprising a plurality of attitude control thrusters each of which comprises a divergent nozzle adapted to utilize the gel decomposition gases for thruster propulsion.

7. A controllable propulsion system in accordance with claim 1, wherein the fuel tank has a maximum height to diameter ratio of 1 to 5.

8. A controllable propulsion system in accordance with claim 7, wherein the fuel gel is contained within a collapsible bellows within the fuel tank, an upper end of said bellows being freely movable to accomodate constriction of the bellows upon compression due to pressurization of the fuel tank, a lower end of said bellows being affixed to a lower wall of the fuel tank and having a fuel exit opening connecting with the means interconnecting the fuel tank and the thrust chamber.

9. A method for providing controllable propulsion power, comprising:
a. gelling an oxidizable liquid fuel,
b. injecting the fuel gel under pressure into contact with a packed bed of solid oxidizer praticles contained within a combustion zone, thereby causing said gel to react with the oxidizer and to evolve combustion gases,
c. ejecting said gases from the combustion zone in a directed manner to provide directional propulsive power and,
d. controlling the injection of fuel gel into the thrust chamber and thereby controlling the occurrence and extent of propulsive power, wherein the oxidizer is selected from the group consisting of perchlorates, diperchlorates, nitrates, oxidized urea of the formula

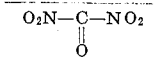

and oxidized thio-urea of the formula

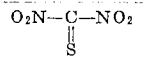

and the oxidizer particles are coated with a thin film of a protective polymer.

10. A method in accordance with claim 9 wherein the polymer is a fluorocarbon polymer.

11. A method in accordance with claim 10 wherein the polymer film comprises from about 0.5 to about 20 percent by weight of the oxidizer.

12. A method in accordance with claim 9 wherein, prior to injection into the oxidizer bed, the fuel gel is contacted with a catalyst and thereby decomposed into a mixture of gaseous decomposition products which is reactable with the oxidizer to provide propulsive reaction gases.

13. A method in accordance with claim 12, wherein catalyst comprises Shell Catalyst-405.

14. A method in accordance with claim 9, wherein the fuel gel is treated with an absorbent to remove gelling agent from the fuel gel prior to reaction of the fuel with the oxidizer.

15. A method in accordance with claim 14, wherein the absorbent is selected from the group consisting of sodium hydrate-asbestos and basic oxides inert to hydrazine and hydrazine derivatives.

* * * * *